US010664384B2

(12) United States Patent
Paveza et al.

(10) Patent No.: US 10,664,384 B2
(45) Date of Patent: May 26, 2020

(54) JAVASCRIPT DEBUGGING USING JUST MY CODE

(71) Applicant: Microsoft Technology Licensing, LLC, Redmond, WA (US)

(72) Inventors: Robert Alan Paveza, Redmond, WA (US); Andrew Richard Sterland, Bellevue, WA (US); Timothy Scott Rice, Seattle, WA (US); Gregg Bernard Miskelly, Seattle, WA (US); Nikhil Khandelwal, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/831,801

(22) Filed: Mar. 15, 2013

(65) Prior Publication Data
US 2014/0282417 A1 Sep. 18, 2014

(51) Int. Cl.
*G06F 9/44* (2018.01)
*G06F 11/36* (2006.01)

(52) U.S. Cl.
CPC ........ *G06F 11/362* (2013.01); *G06F 11/3664* (2013.01)

(58) Field of Classification Search
USPC ........................................................ 717/125
See application file for complete search history.

(56) References Cited

U.S. PATENT DOCUMENTS

| 5,819,093 A | * | 10/1998 | Davidson | ............... G06F 11/362 714/25 |
| 6,052,780 A | * | 4/2000 | Glover | .................... G06F 21/10 380/255 |
| 6,061,518 A | | 5/2000 | Hoffman | |
| 6,065,035 A | * | 5/2000 | Shulman | ............. G06F 11/3624 714/E11.209 |

(Continued)

FOREIGN PATENT DOCUMENTS

| CN | 1506808 A | 6/2003 |
| CN | 1506808 A | 6/2004 |

(Continued)

OTHER PUBLICATIONS

Ryan Seddon, Introduction to JavaScript Source Maps, Mar. 21, 2012, http://www.html5rocks.com/en/tutorials/developertools/sourcemaps/.*

(Continued)

*Primary Examiner* — Jue Louie
(74) *Attorney, Agent, or Firm* — Workman Nydegger

(57) ABSTRACT

The present invention extends to methods, systems, and computer program products for stepping through JavaScript code in a debugger without landing on errors in library or open source code. A debugger receives user inputs designating one or more segments of the JavaScript code as library code. The debugger then performs debugging operations on the JavaScript code. The debugging operations including a stepping operation for stepping through the JavaScript code to identify errors only in user-generated (Continued)

segments of the JavaScript code, wherein the user-generated segments correspond to code that was not designated as library code.

20 Claims, 6 Drawing Sheets

(56) References Cited

U.S. PATENT DOCUMENTS

| | | | | |
|---|---|---|---|---|
| 6,263,456 | B1* | 7/2001 | Boxall | G06F 11/362 709/217 |
| 6,539,464 | B1* | 3/2003 | Getov | G06F 9/5016 711/147 |
| 7,165,243 | B1* | 1/2007 | Pelegri-Llopart | G06F 8/31 717/115 |
| 7,213,123 | B2 | 5/2007 | Gschwind et al. | |
| 7,401,323 | B2 | 7/2008 | Stall et al. | |
| 7,698,692 | B1* | 4/2010 | Garud | G06F 11/3466 714/38.14 |
| 7,730,460 | B1 | 6/2010 | Warren et al. | |
| 7,882,492 | B2 | 2/2011 | Viswanadha et al. | |
| 8,196,107 | B2 | 6/2012 | Stall et al. | |
| 8,225,286 | B2 | 7/2012 | Stall et al. | |
| 8,429,613 | B2 | 4/2013 | Rosen | |
| 9,239,774 | B2 | 1/2016 | Paveza et al. | |
| 9,424,163 | B2 | 8/2016 | Paveza et al. | |
| 2003/0191622 | A1* | 10/2003 | Rawsthorne | G06F 9/45504 703/23 |
| 2004/0064301 | A1* | 4/2004 | Kondo | G06F 8/47 703/22 |
| 2004/0172623 | A1* | 9/2004 | Eckels et al. | 717/125 |
| 2004/0210876 | A1 | 10/2004 | Stall et al. | |
| 2004/0250175 | A1* | 12/2004 | Draine et al. | 714/46 |
| 2006/0095812 | A1* | 5/2006 | Gerard | G06F 11/0715 714/38.1 |
| 2007/0250810 | A1* | 10/2007 | Tittizer | G06F 8/73 717/110 |
| 2007/0250819 | A1 | 10/2007 | Fjeldstad et al. | |
| 2009/0210862 | A1* | 8/2009 | Viswanadha et al. | 717/125 |
| 2009/0260022 | A1 | 10/2009 | Louch et al. | |
| 2010/0153927 | A1 | 6/2010 | Stall et al. | |
| 2010/0235815 | A1 | 9/2010 | Maybee et al. | |
| 2011/0107307 | A1 | 5/2011 | Liu et al. | |
| 2011/0138361 | A1 | 6/2011 | McEntee et al. | |
| 2011/0296381 | A1 | 12/2011 | Mooney | |
| 2012/0030667 | A1* | 2/2012 | Bowyer | G06F 8/61 717/174 |
| 2012/0096437 | A1 | 4/2012 | Bates et al. | |
| 2012/0317552 | A1* | 12/2012 | Bates | G06F 11/3636 717/129 |
| 2013/0055205 | A1* | 2/2013 | Sereni | G06F 8/75 717/124 |
| 2013/0290786 | A1 | 10/2013 | Artzi et al. | |
| 2013/0311973 | A1 | 11/2013 | Rice et al. | |
| 2014/0013306 | A1 | 1/2014 | Gounares et al. | |
| 2014/0137088 | A1* | 5/2014 | Mitchell | G06F 8/53 717/143 |
| 2014/0201709 | A1 | 7/2014 | Euerle | |
| 2014/0237453 | A1* | 8/2014 | Hulick, Jr. | G06F 8/70 717/127 |
| 2015/0199259 | A1 | 7/2015 | Paveza et al. | |
| 2015/0199261 | A1 | 7/2015 | Paveza et al. | |

FOREIGN PATENT DOCUMENTS

| | | |
|---|---|---|
| CN | 104375940 A | 2/2015 |
| JP | 2002196950 A | 7/2002 |
| JP | 2003323318 A | 11/2003 |
| JP | 2004326789 A | 11/2004 |

OTHER PUBLICATIONS

How to: Step Into Just My Code, 2010, http://msdn.microsoft.com/en-us/library/h5e30exc(v=VS.100).aspx.*

Trademark Electronic Search System, http://tmsearch.uspto.gov/bin/showfield?f=doc&state=4807:von3x6.2.2.*

James Goodwill, "Pure Java Server Pages", Jun. 8, 2000, excerpt: "The Components of a JavaServer Page".*

Chris Brown, "Internet Explorer 9 Developer Tools Deep Dive—Part 3: Debugging JavaScript", Jun. 24, 2011, retrieved from: http://blogs.msdn.com/b/cbowen/archive/2011/06/24/internet-explorer-9-developer-tools-deep-dive-part-3-debugging-javascript.aspx.*

"Stepping Over Functions and Files", Jul. 4, 2012, http://web.archive.org/web/20120704214848/http://sourceware.org/gdb/onlinedocs/gdb/Skipping-Over-Functions-and-Files.html.*

James Allardice, "Happy Debugging with JavaScript Source Maps", Jan. 25, 2013, retrieved from: http://globaldev.co.uk/2013/01/happy-debugging-with-javascript-source-maps/.*

Thomas et al. "Software Test Engineering with IBM Rational Functional Tester: The Definitive Resource", 2009, IBM Press, pp. 207-215.*

James Thomas, Debugging Optimised Dojo Applications, Apr. 2012, retrieved from: https://web.archive.org/web/20120629052448/http://jamesthom.as/blog/2012/04/22/debugging-optimised-dojo-apps/.*

Milos, "Compile a RequireJS project to a single file", Jan. 2013, retrieved from: https://web.archive.org/web/20130215070235/http://renderedtext.com/blog/2013/01/23/compile-requirejs-project-to-single-file/.*

Jetbrains, "Compiling/ Running/ Debugging," (Retrieved from: http://www.jetbrains.com/idea/features/compiler.html), Feb. 11, 2013, (9 pages).

Jain, Deepak, "JScript Debugger in Internet Explorer 8," JScript Blog, (Downloaded from: http://blogs.msdn.com/b/jscript/archive/2008/03/13/jscript-debugger-in-internet-explorer-8.aspx), Mar. 13, 2008, (7 pages).

Apple, "Debugging Your Website," Safari Developer Tools Guide, (Retrieved from: http://developer.apple.com/library/safari/#documentation/appleapplications/Conceptual/Safari_Developer_Guide/DebuggingYourWebsite/DebuggingYourWebsite.html), Feb. 11, 2013, (1 page).

Microsoft Corporation, "How to: Step Into Just My Code," (Retrieved from: http://msdn.microsoft.com/en-us/library/h5e30exc%28v=vs.80%29.aspx), Feb. 11, 2013, (2 pages).

"International Search Report & Written Opinion for PCT Application No. PCT/US2014/025198", dated Jul. 16, 2014, Filed Date: Mar. 13, 2014, 10 Pages.

16, "Skip over Certain Classes When Using Step Into in Eclipse's Debugger", Published on: Jun. 29, 2011, Available At: http://www.eclipseonetips.com/2011/06/29/skip-over-certain-classes-when-using-step-into-in-eclipses-debugger/.

Klein, Ramon DE, "Tune the debugger using AutoExp.dat", Published on: Feb. 21, 1999, Available at: http://www.codeguru.com/cpp/v-s/debug/article.php/c1281/Tune-the-debugger-using-AutoExpdat.htm.

"First Office Action and Search Report Issued in Chinese Patent Application No. 201480015943.X", dated Mar. 29, 2017, 14 Pages.

"Second Office Action and Search Report Issued in Chinese Patent Application No. 201480015943.X", dated Dec. 29, 2017, 15 Pages.

"Final Office Action Issued in U.S. Appl. No. 14/155,923", dated Sep. 11, 2015, 23 Pages.

Stall, Mike, "How Can I Debug Just My Code", Retrieved from: «http://blogs.msdn.com/b/jmstall/archive/2004/12/31/344832.aspx», 6 Pages.

"International Preliminary Report on Patentability Issued in PCT Application No. PCT/US2014/025198", dated Jun. 1, 2015, 8 Pages.

"Second Written Opinion Issued in PCT Application No. PCT/US2014/025198", dated Feb. 26, 2015, 5 Pages.

"Just My Code", Retrieved from: «http://msdn.microsoft.com/en-us/library/vstudio/dn457346.aspx», 2015, 14 Pages.

Hall, et al., "Just My Code for JavaScript Windows Store Apps in Visual Studio 2013", Retrieved from: «http:/blogs.msdn.com/b/

(56) References Cited

OTHER PUBLICATIONS visualstudioalm/archive/2013/09/19/just-my-code-for-javascript-windows-store-apps-in-visualstudio-2013.aspx», Sep. 19, 2013, 11 Pages.
"Non-Final Office Action Issued in U.S. Appl. No. 14/156,088", dated Feb. 10, 2015, 19 Pages.
"Non-Final Office Action Issued in U.S. Appl. No. 14/155,923", dated Feb. 10, 2015, 27 Pages.
Jay, "On the Impacts of Debugging with Just My Code", Retrieved from: «http://www.jaylee.org/post/2010/07/05/VS2010-On-the-Impacts-of-Debugging-with-Just-My-Code.aspx», Jul. 5, 2010, 3 Pages.
"Tips and Tricks: Ignoring Library Code while Debugging in Chrome", Retrieved from: «https://web.archive.org/web/20160305012027/https://divshot.com/blog/tips-and-tricks/ignoring-library-code-while-debugging-in-chrome», Sep. 5, 2013, 8 Pages.
"Using the F12 Developer Tools to Debug Javascript Errors", Retrieved from: «https://technet.microsoft.com/en-us/windows/gg699336(v=vs.60)», Retreived on Nov. 16, 2011, 4 Pages.
Sullivan, Brad, "Visual C++ Team Blog", Retreived from:«http://blogs.msdn.com/b/vcblog/archive/2013/06/26/just-my-code-for-c-in-vs-2013.aspx», Jun. 26, 2013, 6 Pages.
"Office Action Issued in European Patent Application No. 14720771.6", dated Aug. 7, 2018, 7 Pages.
"Office Action Issued in Chinese Patent Application No. 201480015943.X", dated Jul. 4, 2018, 10 Pages.
"Office Action in Japanese Patent Application No. 2016-501782", dated Jan. 25, 2018, 7 Pages.
"Office Action Issued in Japanese Patent Application No. 2016-501782", dated Sep. 11, 2018, 7 Pages.
Hideyuki, Shurooka, "Step Up! Leave PHP Last Document", In Web + DB Press, Technical Review Co, vol. 49, Mar. 25, 2009, 13 Pages.
Kitamura, Kenji, "Google API Development Environment", In Monthly ASCII Dot Techno Logis, vol. 16, Issue 6, Apr. 23, 2011, 13 Pages.
Maba, Satoshi, "Debugging is Also Rhythm! Stop at the Intended Place, Debugsa Speed-Up Ikuru", In Web + DB Press, Technological Review Co., vol. 43, Mar. 25, 2008, 12 Pages.
"Fourth Office Action Issued in Chinese Patent Application No. 201480015943.X", dated Mar. 1, 2019, 6 pages.

* cited by examiner

JAVASCRIPT DEBUGGING USING JUST MY CODE

BACKGROUND

A broad array of libraries and plugins are available for JavaScript, which allows for easier development of JavaScript-based applications. Because these libraries have already been debugged and optimized, a JavaScript developer will usually assume that the libraries themselves do not have to be debugged. Additionally, many of these tools are compressed and minified so that the underlying code is obfuscated and made unreadable to the developer, which prevents JavaScript developers from further modifying these third-party libraries. Errors in a JavaScript developer's code may create errors within these libraries, which can cause confusion when debugging the code if the developer cannot or does not want to modify the library code. Instead, the developer is likely more interested in identifying errors in his or her own code.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A debugger allows JavaScript developers to treat third-party libraries as a black box so that errors in those libraries are not identified to the developer. Instead, the JavaScript developer is able to rapidly identify how their own code is at fault for execution problems.

A script host identifies whether input is interesting for debugging or not, i.e., whether code is the developer's code or third-party code. Based on these inputs, a script debugger excludes or steps over uninteresting input automatically.

To provide an efficient JavaScript debugging experience, a debugging monitor provides a new type of stepping mechanism, which is referred to herein as "Step to Document Boundary." Using other common stepping mechanics (e.g., Step Into, Step Over, Step Out) would either miss interesting inputs or would be too chatty during remote debugging.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
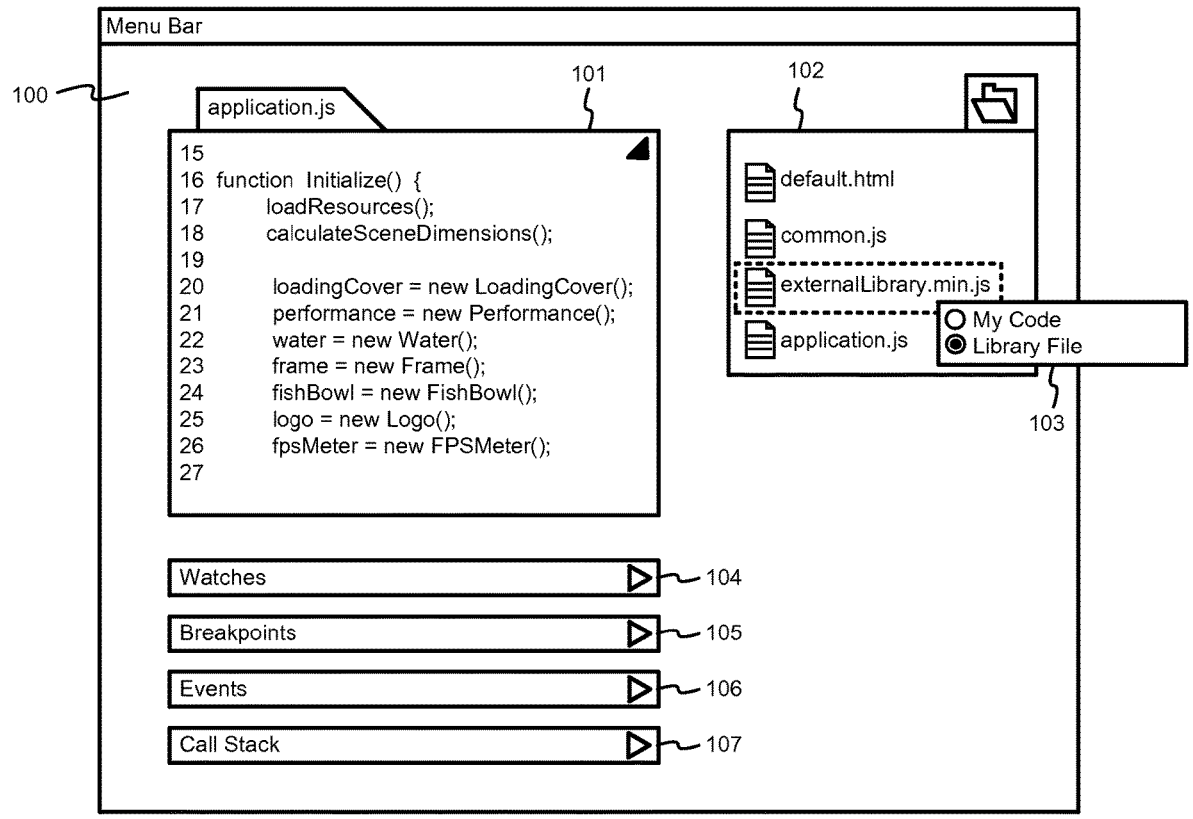
FIG. 1 illustrates a user interface for a debugger tool or integrated development environment application according to an example embodiment.

FIG. 1 illustrates a user interface 100 for a debugger tool or integrated development environment (IDE) application according to an example embodiment. User interface 100 allows developers to select code for debugging and to identify whether the code was created by the developer—i.e., "my code"—or was from an outside source.

A code window 101 shows lines of code for a selected source file, such as a JavaScript document. A source documents window 102 shows files that are available for debugging. A developer may select one of the source files using a pointing device, such as a mouse or touch pad, or using menu commands. These files may be code written by the developer, such as the application.js example code shown in code window 101. Libraries, plug-ins and other external files that are being used by the developer, but that were not created by the developer, can also be shown in window 102. For example, rather than recreating an existing feature, the developer may obtain an open-source document with code for that feature and use the open-source document in a new application.

The developer may select files in source documents window 102 and open a code designation window 103, such as by "right-clicking" with a mouse or using menu commands. The developer may designate the selected code as a library file or as the developer's own code—i.e., "my code"—by selecting the appropriate option. The file designation is used by the debugger tool or IDE to determine whether to land on or display errors in code for that file.

User interface 100 also provides the developer with other configuration options, such as the ability to set watches, 104, breakpoints 105, or events 106 for the debugger tool. The developer may also view the call stack 107 for selected code.

Figure 2:
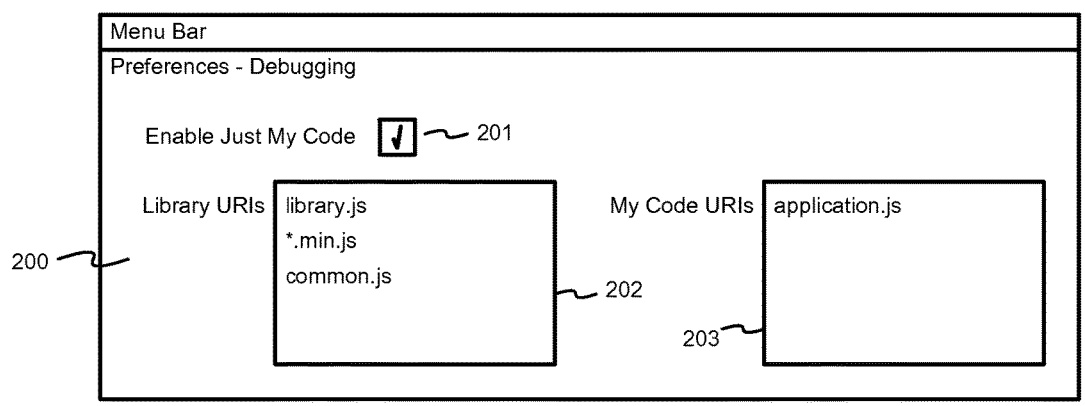
FIG. 2 illustrates a user interface for selecting developer preferences when debugging with a just-my-code feature.

FIG. 2 illustrates a user interface 200 for selecting developer preferences when debugging with a just my code feature. The developer may select to limit debugging to files designated as "my code" using a checkbox 201 or other feature. The developer may designate URIs in window 202 for the debugger tool or IDE to use when identifying library code. A My Code URI window 203 can be used by the developer to specify files that should be considered as "my code" by the debugger.

User interface 200 allows users to specifically select documents and files that will be considered to be library files (202) or that will be marked as "my code" (203). The files that are not specifically designated as library files or as "my code" can be marked as such by wildcard matching or heuristics. For example, a particular file library.js is specifically designated as a library file, and using the wildcard *.min.js every JavaScript that has been minified script is also considered to be a library file and would be opted out of "my code."

During debugging of their user script code a developer often inserts breakpoints where they can inspect the test environment to determine whether it is functioning as expected. At the breakpoints, the developer may inspect variables, step to different functions without executing the code in between, edit code and continue execution, review exception handling, etc. When the debugger hits a breakpoint in the debuggee application, the debuggee freezes until execution is restarted by the developer. However, the developer may not want to halt the application within library or open source code because that library or open source code is likely to have been debugged already and, therefore, is likely not the cause of errors in the debuggee application. Instead, the developer wants to see the proximate cause of errors, which likely falls within the developers own code ("my code").

Rather than requiring the developer to navigate manually to his or her own code that is causing an error, a debugger using a Just My Code feature will automatically skip over the library and open source code. When the debugger tool encounters an exception that would normally trigger a halt, the debugger evaluate whether the source file constitutes "my code." If it does not, the debugger will scan the execution stack for the most recent document on the execution stack that match a "my code" URI. Once the debugger finds a "my code" document, it will highlight the relevant line in the debugger (102). If no "my code" document is found, the document in which the exception occurred may be shown or optionally, the exception may be completely ignored. All other debugger features will behave in the typical way. The debugger will generally not show source code for the library or open source files; however, developers may also opt to inspect "not my code" files by navigating the call stack (107), for example.

Figure 3:
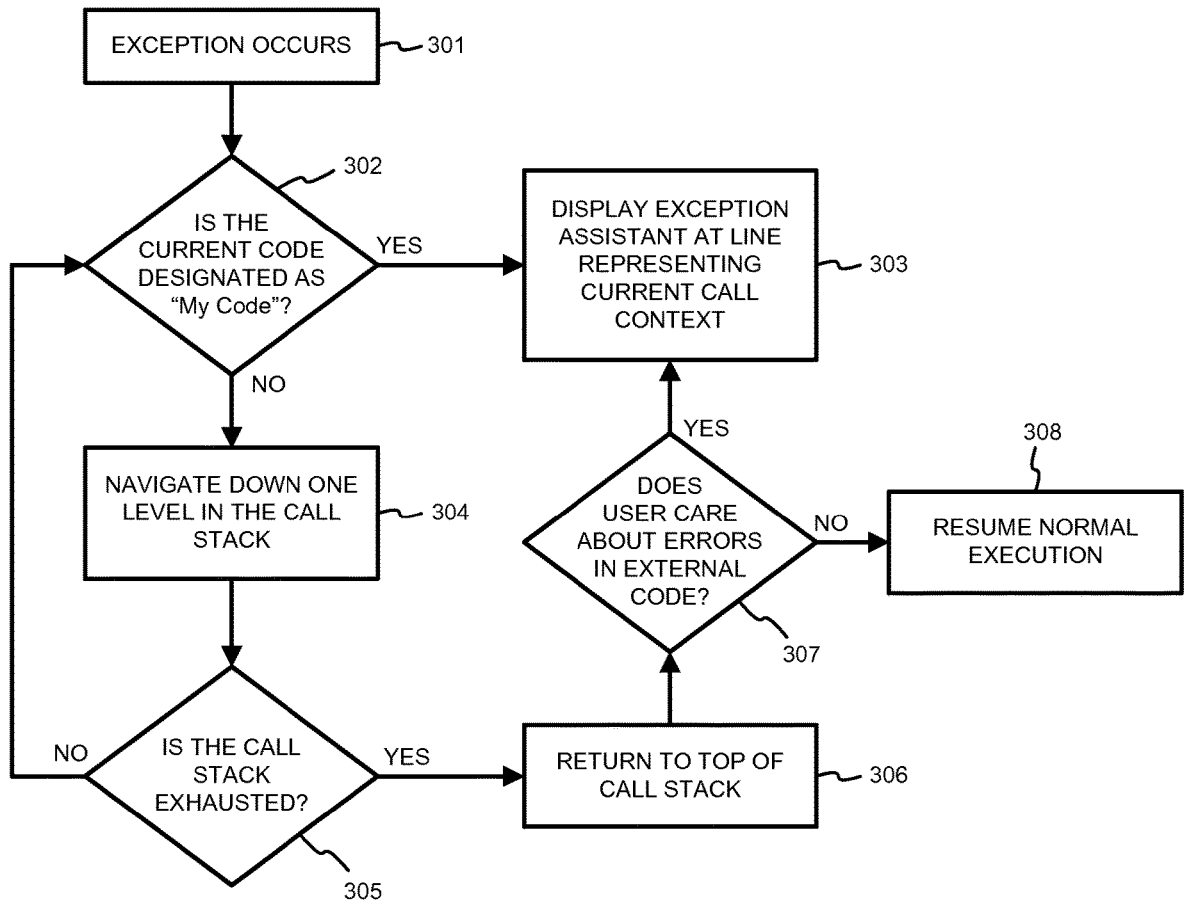
FIG. 3 is a flow chart of a process for evaluating how to handle a break-triggering exception in a debugger according to one embodiment.

FIG. 3 is a flow chart of a process for evaluating how to handle a break-triggering exception in a debugger according to one embodiment. This process illustrates how to handle first chance or user unhandled exceptions, for example. In step 301, an exception occurs in the debugger. In step 302, the debugger determines whether the code where the exception occurred has been designated as "my code." If the current code has been designated as "my code," then in step 303, the debugger displays the line in the script representing the current call context where the error occurred.

If the current code has not been designated as "my code" in step 302, then the debugger automatically navigates down one level in the call stack in step 304. The debugger evaluates if the call stack has been exhausted in step 305. If the call stack has not been exhausted, then the process returns to step 302 where the debugger evaluates if this level of the call stack has been designated as "my code" and proceeds as described above.

If the call stack is exhausted in step 305, then the process moves to step 306 and the debugger returns to the top of the call stack. At step 307, the debugger further evaluates whether the user is interested in reviewing errors in external code. The user may indicate this in a configuration setting for all external errors or on an error-by-error basis, such as by responding to a pop-up user interface query. If the user does want to review external errors, then the process then moves to step 303 where the debugger displays the exception assistant at the line in the script representing the context at the top of the call stack. Otherwise, the user may optionally ignore the exception at step 307. If the exception is ignored, then the process moves to step 308 and normal execution resumes.

To provide an efficient JavaScript debugging experience, the debugger tool provides a new type of stepping mechanism: "Step to Document Boundary." A process debug manager (PDM) mediates the relationship between a script engine's debugger and the user interface. The PDM interprets user inputs and translates them to the script engine's underlying step behavior.

Common stepping patterns for debugging are "step in/next," "step over," and "step out," which identify the relationship of the current programming language's scope to expected functional behavior. For JavaScript, which is a document-oriented programming language, the script may come from a number of different files, but there is no compilation of the files. The user interface(s) 100, 200 can be used to indicate whether the code in a JavaScript document is "my code," library code, or some other designation. In order to support debugging of "my code" efficiently for JavaScript, a new stepping behavior is introduced. If a developer wishes to "step in" into a function call, and that function call exists in a document that is not marked as "my code," prior debuggers would require the developer to issue "step in" commands. If the developer was remote debugging, this would become very "chatty" on the network and could take a long time to execute.

Using the "step to document boundary" command, the PDM tells the script engine to continue running until it leaves the current document. This feature may be automatically triggered by the debugger so that it is transparent to the developer. This functionality may exist in the other direction as well; if a user chooses to "step out" of a function call, the calling function may not have been "my code," at which point the user should land at the first "my code" document instruction in the call stack below the currently-executing function. If no "my code" document exists at this point, execution should resume normally. This has the effect of hiding code that the developer did not create and does not care about during debugging.

Embodiments of the invention annotate all function bodies when debugging with entry and exit events to indicate the document boundaries, which tells the debugger when the script is going to transition documents.

Figure 4:
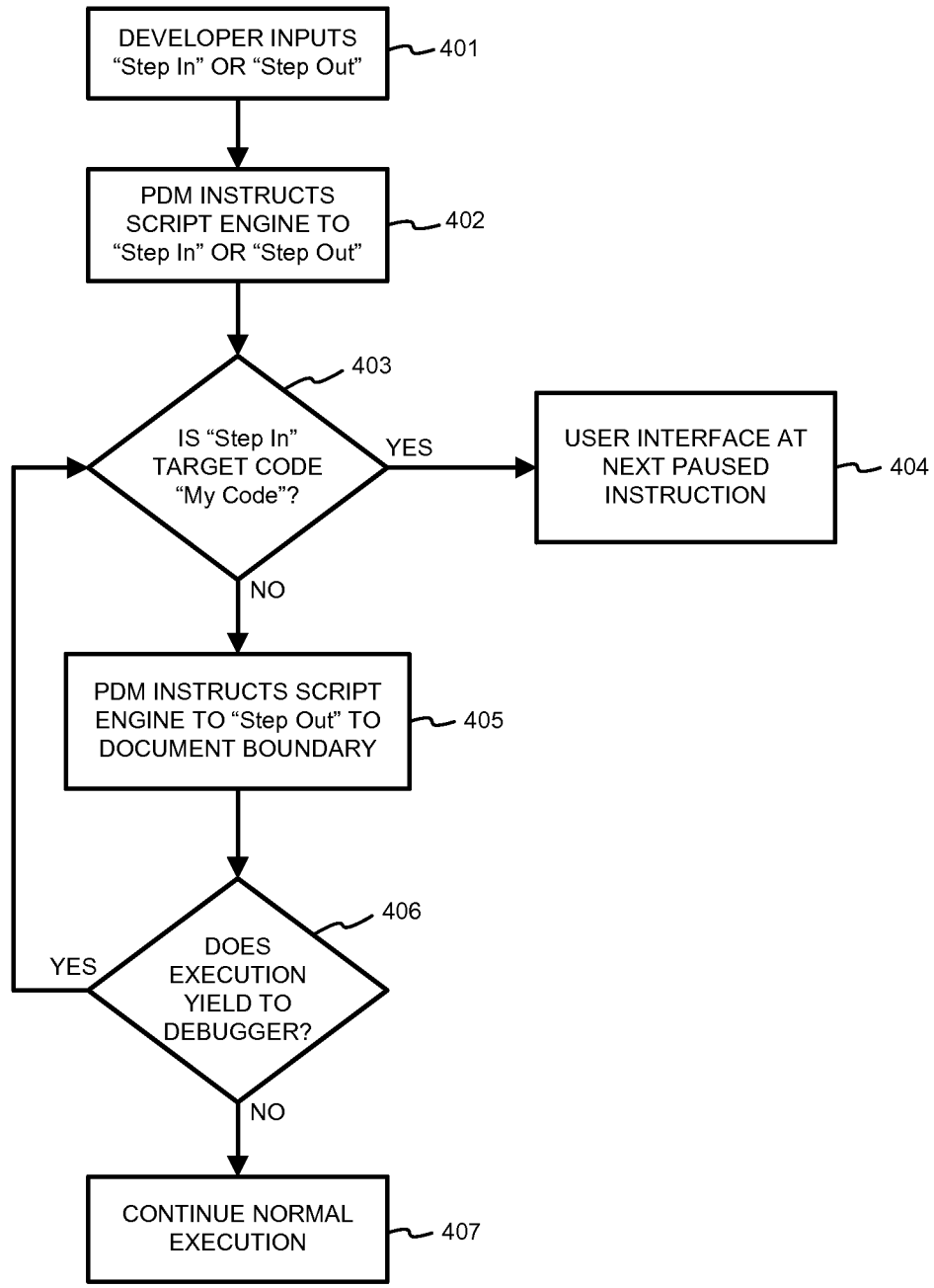
FIG. 4 is a flowchart illustrating a process for handling stepping behavior of the debugger according to one embodiment.

FIG. 4 is a flowchart illustrating a process for handling stepping behavior of the debugger according to one embodiment. This process may be added to existing debuggers to support the Step to Document Boundary functionality. In step 401, the developer gestures to step-in or step-out (i.e., any stepping action) at the user interface level. In step 402, the PDM instructs the script engine to perform the corresponding action. In step 403, the debugger evaluates whether the target code that the developer has "stepped into" is "my code" in the next code statement. If the target code is "my code," then in step 404 the user interface shows the debugging event and the code at the next paused instruction.

If the target code is not "my code" (e.g., if the script engine steps in to library code), then in step 405 the PDM instructs the script engine to step-out to the next document boundary—i.e., "step to document boundary." In step 405, the script engine is in run mode until it detects a document boundary event. In step 406, the process determines whether the script execution yields to the debugger. If script execution does not yield, then in step 407, the script continues normal execution. If script execution does yield, then the process returns to step 403 and continues as described above for the next document.

Accordingly, for each debugging event, the debugger will determine whether to pause if it lands on "my code" or to step through documents and continue normal execution if it lands on library code or other code that has not been labeled "my code."

In other embodiments, the document level may not be a useful degree of granularity. For example, a developer may compile all of their JavaScript files into a single file before deploying the application. At that point, the document level is not a fine enough layer of granularity to distinguish between "my code" and library code. More specifically, if the application is compiled into a single document, then the document can only be labeled as all "my code" or "not my code."

To compensate for this situation, the developer may add annotations or code level comments to the source document to indicate where document boundaries occur. This would allow the developer to annotate which parts of the code is "my code" and which is "not my code."

Figure 5:
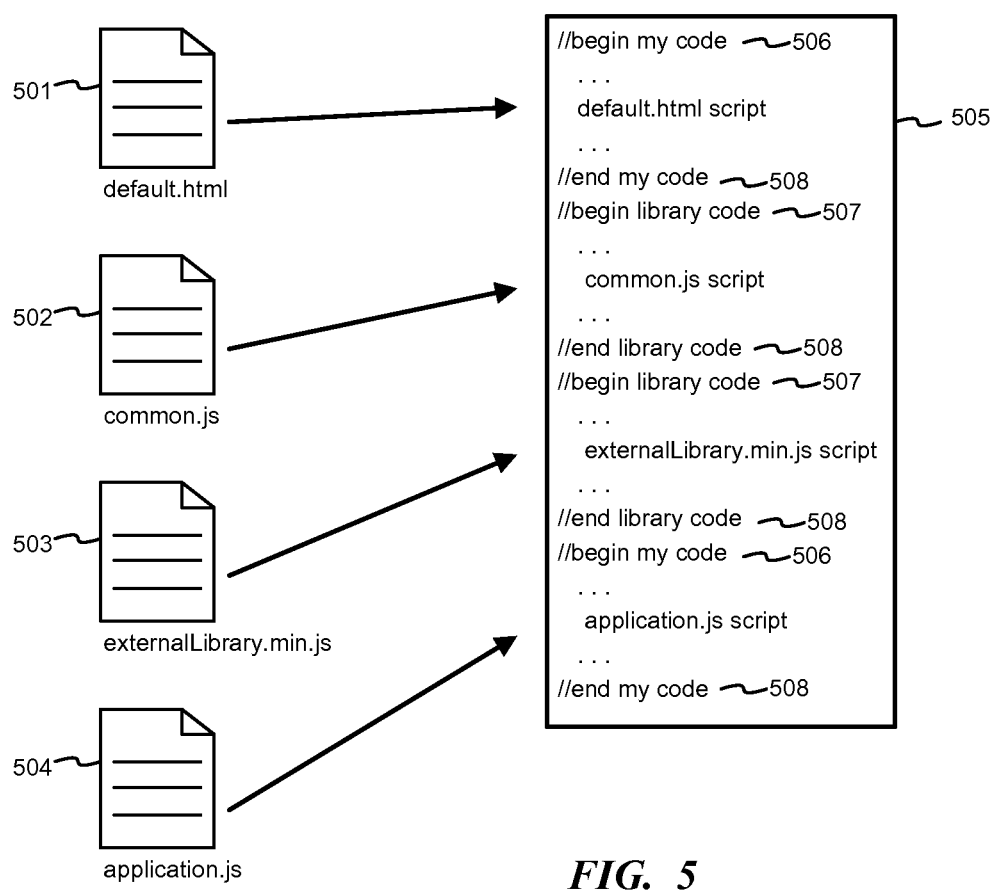
FIG. 5 illustrates an annotated compiled document with comments that indicate which portions are developer code and which portions are library code.

FIG. 5 illustrates an annotated compiled document with comments that indicate which portions are "my code" and which portions are "not my code." For example, source documents 501-504 may be compiled into one document 505 by the developer. Documents 501 and 504 are developer generated scripts and documents 502 and 503 are library code, open source documents, or other scripts that the developer does not want to debug. Annotations are added to the complied document to indicate where "my code" begins 506 and where library code begins 507. Additional comments 508 may indicate where each segment ends.

When the debugging compiled file 505, the debugger looks for comments 506-508 to identify document boundaries. For example, when an error occurs in library code, the debugger looks for the end library code annotation 508 to when implementing the step to document boundary functionality.

Figure 6:
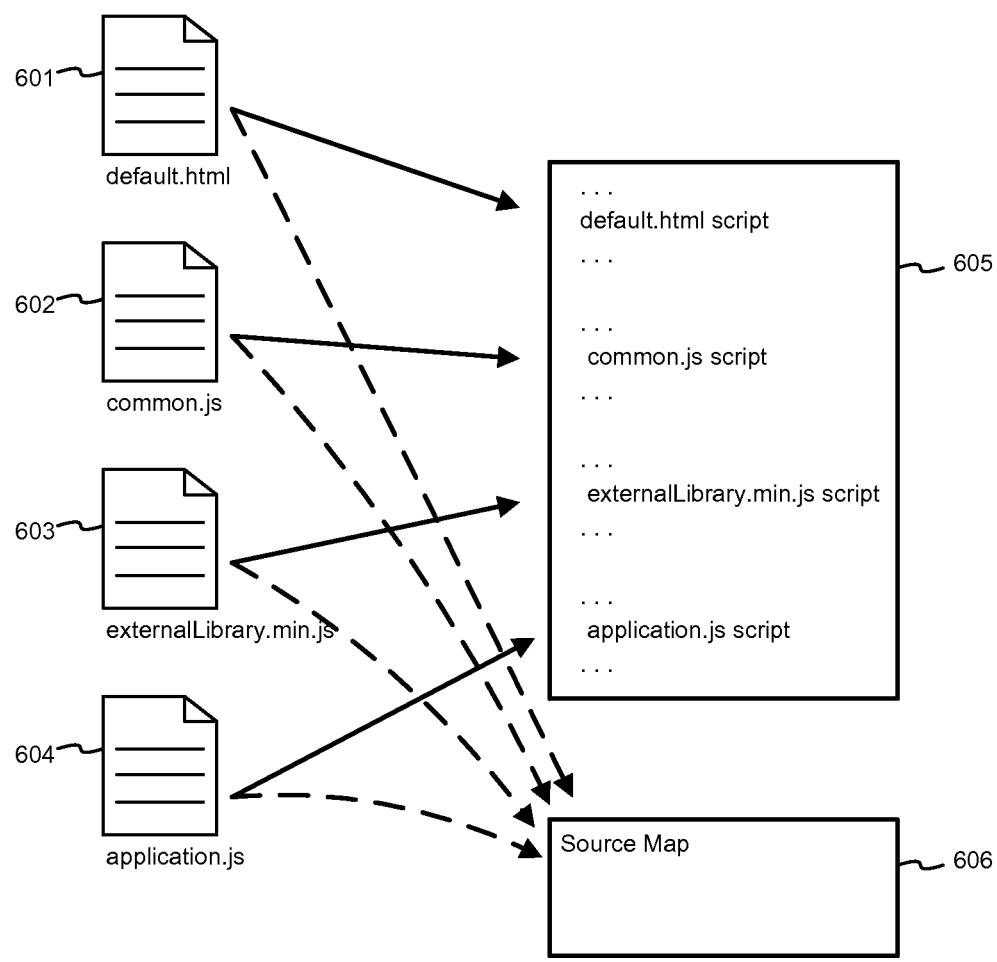
FIG. 6 illustrates an embodiment in which source maps are used to identify document boundaries within a compiled document.

FIG. 6 illustrates another embodiment in which source maps are used to identify document boundaries and content within a compiled document. Source maps provide a way to map a combined and minified file 605 back to an unbuilt state 601-604. Additionally, the source map provides a way to map a combined file back to other languages that compile into JavaScript, such as TypeScript, CoffeeScript, or Dart. A source map 606 is generated when the JavaScript is built for production. The original JavaScript files 601-604 are minified and combined into a production file 605. The source map 606 holds information about the original files 601-604. When the developer queries a certain line and column number in JavaScript 605, the debugger can do a lookup in source map 606 to determine the original location. The debugger tool can parse source map 606 automatically and make it appear as though it is running unminified and uncombined files 601-604. The source map 606 information may be used to determine document boundaries for the Step to Document Boundary function.

Figure 7:
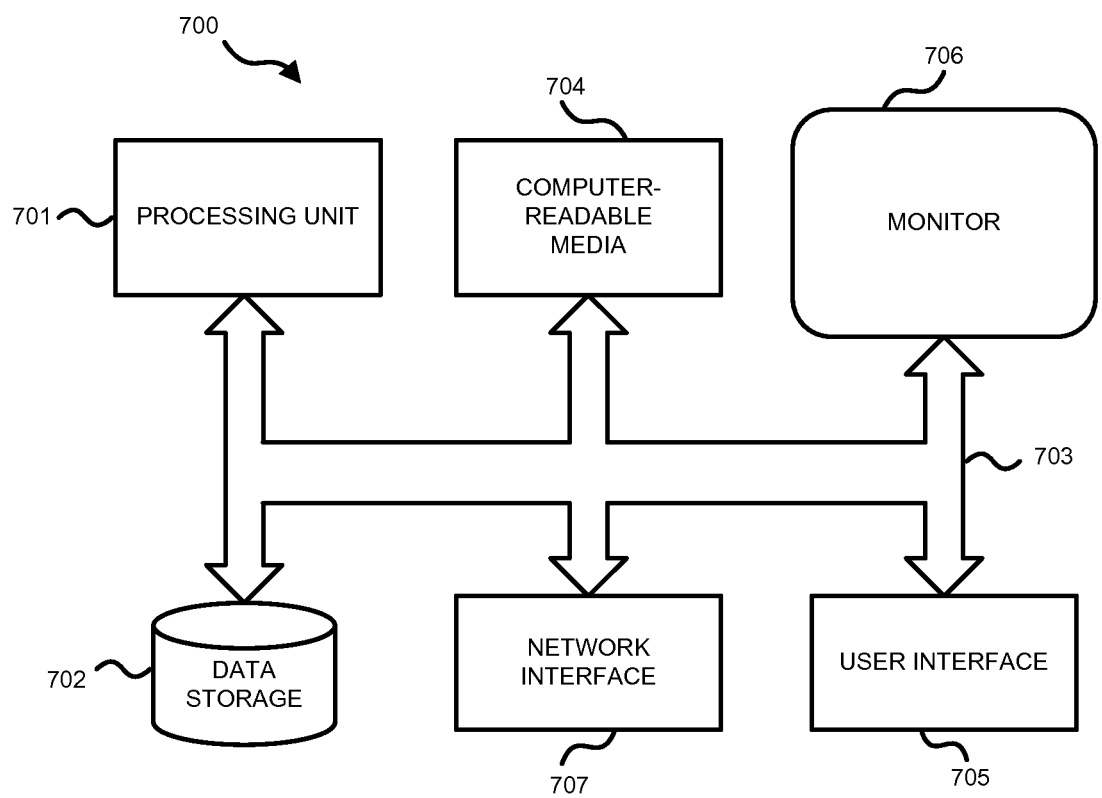
FIG. 7 illustrates an example of a suitable computing and networking environment for a JavaScript debugging using a just-my-code feature.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Processing unit 701 may run developer and debugging tools, such as an IDE, JavaScript editor, or browser, for implementing aspects of the invention described herein.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

Data storage 702 and computer-readable media 704 may hold software applications for developing and debugging JavaScript applications, such as an IDE, JavaScript editor or browser. Additionally, data storage 702 and computer-readable media 704 may hold JavaScript files, such as developer generated code (i.e., "my code") and library, open source, third-party, and other code (i.e., "not my code"). Files in other programming languages, such as TypeScript, CoffeeScript, or Dart, may also be stored.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 701 through a user input interface 705 that is coupled to the system bus 703, but may be connected by other interface and bus structures, such as a parallel port, game port or a universal serial bus (USB). User interface 705 may provide a developer with tools for identifying sections of JavaScript code as "my code" or "not my code."

A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Network interface 707 may also be used to provide access to software and code running on a remote computer or terminal so that a developer using system 700 can debug the code running on the remote device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
  a processor; and
  a memory coupled to the processor, the memory having program instructions stored thereon that, upon execution by the processor, cause the computer system to:
    step through a scripting language code document compiled from a plurality of source documents, wherein at least one source document comprises user-generated code and at least one different source document comprises library code only, to identify whether errors are present in the scripting language code document;
    determine that an identified error was generated by a library code segment based on determining that particular code that generated the error is from the at least one different source document comprising the library code only;
    based on determining the identified error was generated by the library code segment, scan an execution stack to identify a most recently executed user-generated code segment, wherein scanning the execution stack comprises locating a document boundary within the scripting language code document by identifying annotations within the scripting language code document that indicate a beginning and an end of at least one portion of the at least one source document comprising the user-generated code; and identify, based upon the located document boundary, that a code statement provided after the located document boundary is user-generated code and presenting the code statement on a debugger user interface.

2. The computer system of claim 1, wherein the document boundary is a code-level comment included in the scripting language code document.

3. The computer system of claim 1, wherein an evaluation is performed to determine whether a user is interested in reviewing errors in the at least one different source document comprising the library code only.

4. The computer system of claim 1, wherein user-generated code segments and library code segments are associated with separate documents identified by a source map.

5. The computer system of claim 1, wherein a relationship between the debugger user interface and a script engine debugger is mediated by a process debug manager.

6. The computer system of claim 5, wherein the process debug manager translates user inputs into a step behavior of the script engine debugger.

7. The computer system of claim 5, wherein the process debug manager instructs the script engine when to run.

8. The computer system of claim 7, wherein the process debug manager instructing the script engine when to run is transparent to a user.

9. The computer system of claim 5, wherein the process debug manager instructs the script engine to step out of a function call.

10. A method for debugging code in a computer system, the method comprising:

stepping through a scripting language code document compiled from a plurality of source documents, wherein at least one source document comprises user-generated code and at least one different source document comprises library code only, to identify whether errors are present in the scripting language code document;

determining that an identified error was generated by a library code segment based on determining that particular code that generated the error is from the at least one different source document comprising the library code only;

based on determining the identified error was generated by the library code segment, scanning an execution stack to identify a most recently executed user-generated code segment, wherein scanning the execution stack comprises locating a document boundary within the scripting language code document by identifying annotations within the scripting language code document that indicate a beginning and an end of at least one portion of the at least one source document comprising the user-generated code; and identifying, based upon the located document boundary, that a code statement provided after the located document boundary is user-generated code and presenting the code statement on a debugger user interface.

11. The method of claim 10, wherein the document boundary is a code-level comment included in the scripting language code document.

12. The method of claim 10, wherein an evaluation is performed to determine whether a user is interested in reviewing errors in the at least one different source document comprising the library code only.

13. The method of claim 10, wherein user-generated code segments and library code segments are associated with separate documents identified by a source map.

14. The method of claim 10, wherein the annotations indicate when a script is going to transition between documents.

15. One or more hardware storage devices having stored thereon computer-executable instructions that are executable by one or more processor(s) of a computing system to cause the computing system to at least:

step through a scripting language code document compiled from a plurality of source documents, wherein at least one source document comprises user-generated code and at least one different source document comprises library code only, to identify whether errors are present in the scripting language code document;

determine that an identified error was generated by a library code segment based on determining that particular code that generated the error is from the at least one different source document comprising the library code only;

based on determining the identified error was generated by the library code segment, scan an execution stack to identify a most recently executed user-generated code segment, wherein scanning the execution stack comprises locating a document boundary within the scripting language code document by identifying annotations within the scripting language code document that indicate a beginning and an end of at least one portion of the at least one source document comprising the user-generated code; and identify, based upon the located document boundary, that a code statement provided after the located document boundary is user-generated code and presenting the code statement on a debugger user interface.

16. The one or more hardware storage devices of claim 15, wherein the document boundary is a code-level comment included in the scripting language code document.

17. The one or more hardware storage devices of claim 15, wherein an evaluation is performed to determine whether a user is interested in reviewing errors in the at least one different source document comprising the library code only.

18. The one or more hardware storage devices of claim 15, wherein user-generated code segments and library code segments are associated with separate documents identified by a source map.

19. The one or more hardware storage devices of claim 18, wherein the source map identifies document boundaries and content.

20. The one or more hardware storage devices of claim 18, wherein a relationship between the debugger user interface and a script engine debugger is mediated by a process debug manager.

* * * * *